United States Patent [19]

O'Brien

[11] Patent Number: 5,509,276
[45] Date of Patent: *Apr. 23, 1996

[54] UNIVERSAL CONDENSER FOR AN AIR CONDITIONING SYSTEM

[75] Inventor: Stephen W. O'Brien, Fort Worth, Tex.

[73] Assignee: Tripac International, Fort Worth, Tex.

[ * ] Notice: The term of this patent shall not extend beyond the expiration date of Pat. No. 5,456,089.

[21] Appl. No.: 371,398

[22] Filed: Jan. 11, 1995

Related U.S. Application Data

[63] Continuation of Ser. No. 36,395, Mar. 24, 1993, Pat. No. 5,456,089.

[51] Int. Cl.$^6$ ................................................. F25B 39/04
[52] U.S. Cl. .......................... 62/298; 62/474; 62/507; 165/149
[58] Field of Search ............................ 62/298, 299, 474, 62/507, 509, 297; 165/67, 149

[56] References Cited

U.S. PATENT DOCUMENTS 4,707,999  11/1987  Ohta et al. .
4,920,766   5/1990  Yamamoto et al. .
5,095,716   3/1992  You .
5,146,766   9/1992  Martins .
5,163,716  11/1992  Bolton et al. .
5,169,178  12/1992  Hunzinger .
5,183,103   2/1993  Tokutake .
5,205,354   4/1993  Lesage .

FOREIGN PATENT DOCUMENTS 1-289714A  5/1988  Japan .

OTHER PUBLICATIONS

Tripac Multifit Superflo Condensers, Jan., 1993.

Primary Examiner—Harry B. Tanner
Attorney, Agent, or Firm—Harold E. Meier

[57] ABSTRACT

A universal condenser for an air conditioning system for replacing a custom built condenser. The universal condenser enables use of standardized parts resulting in less inventory requirements. The universal condenser includes a tube assembly fastener and mounting rails for supporting the condenser in an engine well. The standardized parts include a limited number of specifically designed brackets, a set of tubes, and the fastener for securing a tube to the condenser.

20 Claims, 6 Drawing Sheets

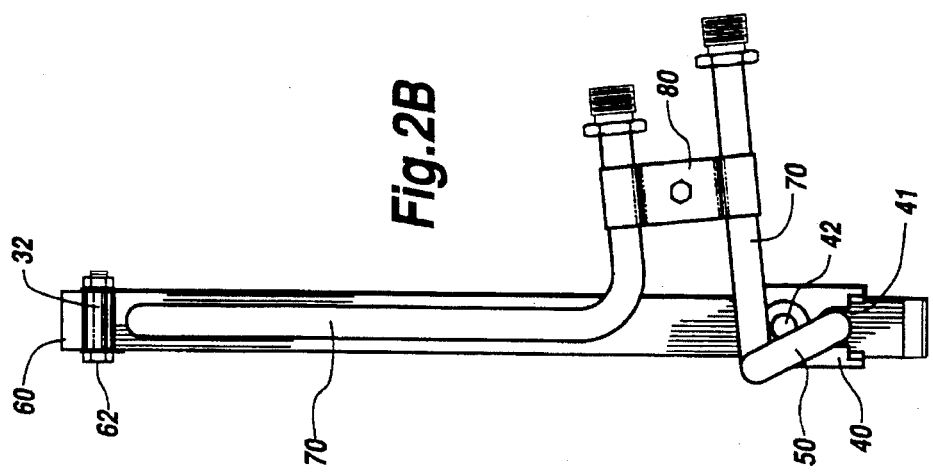
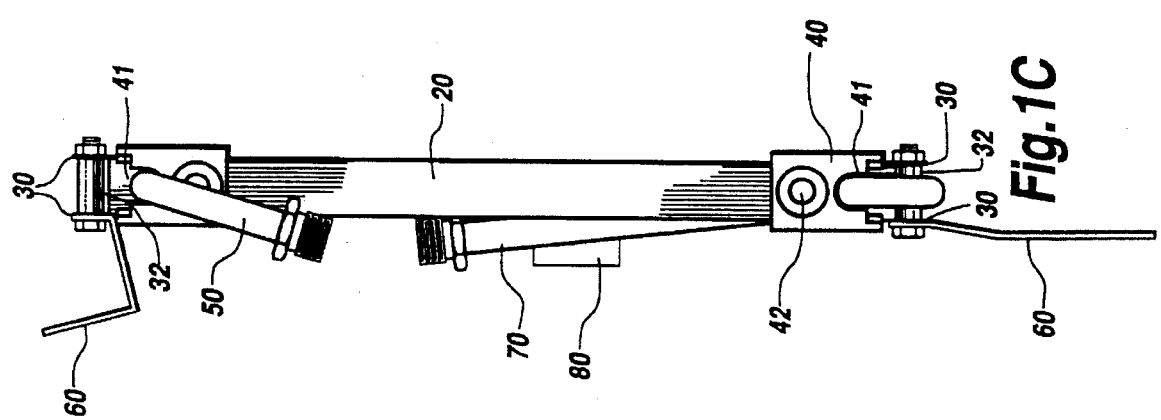
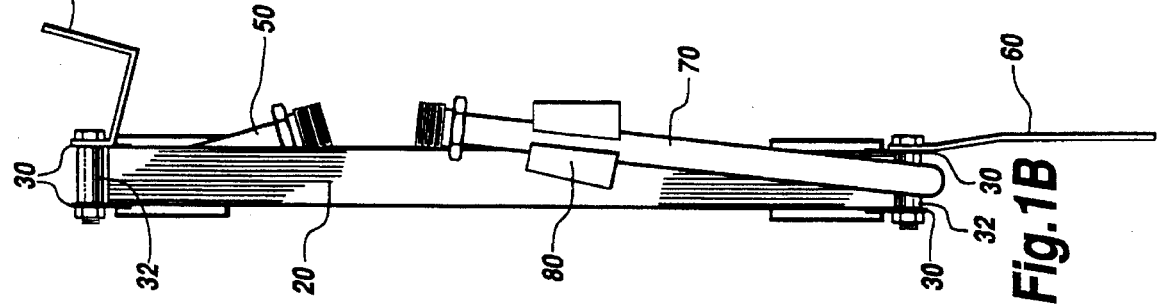

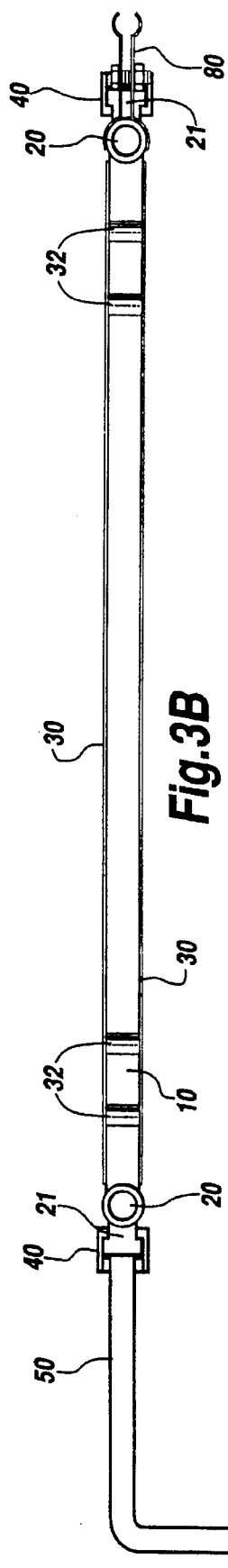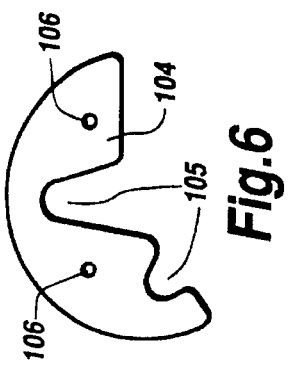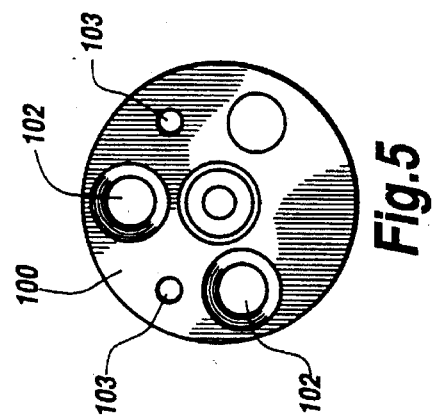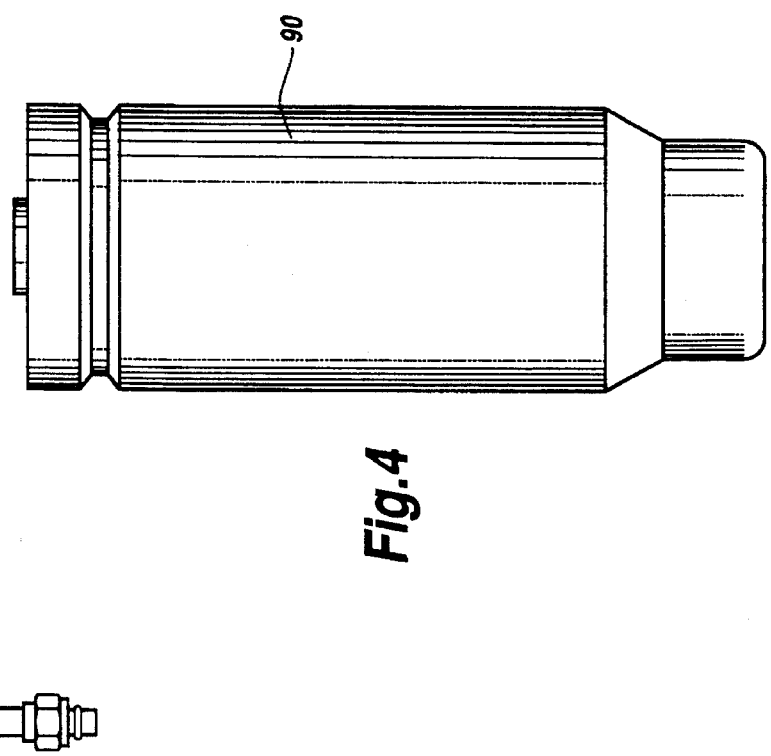

UNIVERSAL CONDENSER FOR AN AIR CONDITIONING SYSTEM

This is a continuation of U.S. patent application Ser. No. 08/036,395 filed Mar. 24, 1993, U.S. Pat. No. 5,456,089.

TECHNICAL FIELD

The present invention relates to standardized air conditioning condensers and more specifically to a universal condenser for an air conditioning system.

BACKGROUND OF THE INVENTION

In the automotive air conditioning aftermarket business, air conditioning systems are presently custom built for each particular make and model of automobile. The systems include a custom built condenser and custom built brackets for supporting the condenser in the engine well. The brackets are generally permanently welded to the condenser housing. The tubes which carry the refrigerant to and from the condenser are presently manufactured and attached in the specific length and shape necessary to assemble the custom built air conditioning system. Because each make and model of automobile requires a different specifically designed and shaped air conditioning assembly, automotive air conditioning suppliers in the aftermarket are forced to maintain extensive inventories of custom built condensers at significant cost.

The present invention addresses the foregoing problems by providing a limited number of standardized condensers which are fitted with appropriate brackets and tubing such that the characteristics of a custom built condenser can be duplicated. The present invention employs five condensers each with a slightly different shape and performance characteristic in order to duplicate the performance characteristic of a desired custom built condenser. After one of the five condensers is determined to have the desired performance characteristic, the selected condenser is fitted upon installation with specifically manufactured and shaped brackets, appropriately shaped tubing for carrying a desired refrigerant, and a series of tube fasteners for securing the tubes to the condenser in a sealing engagement. Using this approach, an automotive air conditioning supplier is only required to stock the five standard condensers and a collection of brackets, tubing, tube fasteners, and receiver driers in order to meet the performance requirements of a custom built condenser.

The brackets of the present invention are manufactured and shaped in order to facilitate the assembly of the standard condenser within the engine well of an automobile designed to house a custom built condenser. The brackets required by the particular installation are stocked in inventory by the supplier and although this represents an inventory requirement such a requirement is significantly less than the inventory required to stock an equivalent number of custom built condensers.

In the alternative, the specifically shaped brackets are manufactured as needed by the supplier through the use of an automated CNC turret press. The CNC turret press stamps from a piece of sheet metal a set of brackets according to a desired specification in order to fit the requirements of a particular installation. This ability to efficiently provide specifically shaped brackets in direct response to ascertained demand provides the automotive air conditioning supplier with additional savings in inventory requirements.

The tubes of the present invention are designed to assemble any of the five standard condensers and may be supplied in varying lengths in order to fit the requirements of a particular installation or designed and shaped for that particular installation. The tubes are supplied in straight lengths and upon installation are bent to fit the space limitations of the particular engine well. The present invention also employs a two part slide fastener for securing the tubes to the condenser. The fastener makes field installation of the condenser easy and environmentally safe because an adequate seal is achieved between the tube assembly and the condenser.

SUMMARY OF THE INVENTION

The present invention includes a universal condenser for replacement in an air conditioning system, the multifit condenser having a uniquely designed condenser housing. The condenser housing has a pair of railings, running along the top and bottom edges for fastening mounting brackets to the condenser housing. These brackets enable the installation of the condenser in an engine well designed to house a custom built condenser. The condenser housing also includes two tubular sides for conducting a refrigerant to the internal tubing of the condenser. The tubular sides contain a mount for fastening the tubes carrying the refrigerant to the condenser housing from other parts of the air conditioning system. The tubes are secured to the mount using a special fastener that creates an environmentally secure seal between the tubes and the condenser housing. A receiver drier may also be connected to the universal condenser.

BRIEF DESCRIPTION OF THE DRAWINGS

A more complete understanding of the present invention may be had by reference to the following Detailed Description when taken in conjunction with the accompanying Drawings wherein:

FIG. 1B is a first side illustration of an air conditioning system condenser of the present invention as a replacement for a first custom built air conditioning system condenser;

FIG. 1C is a second side illustration of an air conditioning system condenser of the present invention as a replacement for a first custom built air conditioning system condenser;

FIG. 2B is a first side illustration of an air conditioning system condenser of the present invention as a replacement for a second custom built air conditioning system condenser;

FIG. 3B is a top illustration of an air conditioning system condenser of the present invention as a replacement for a third custom built air conditioning system condenser;

FIG. 4 is an illustration of a receiver drier of the present invention;

FIG. 5 is an illustration of the specifically designed top pad of the receiver drier of the present invention; and FIG. 6 is an illustration of the specifically designed fastener of the receiver drier of the present invention.

DETAILED DESCRIPTION OF THE DRAWINGS

Figure 1A:
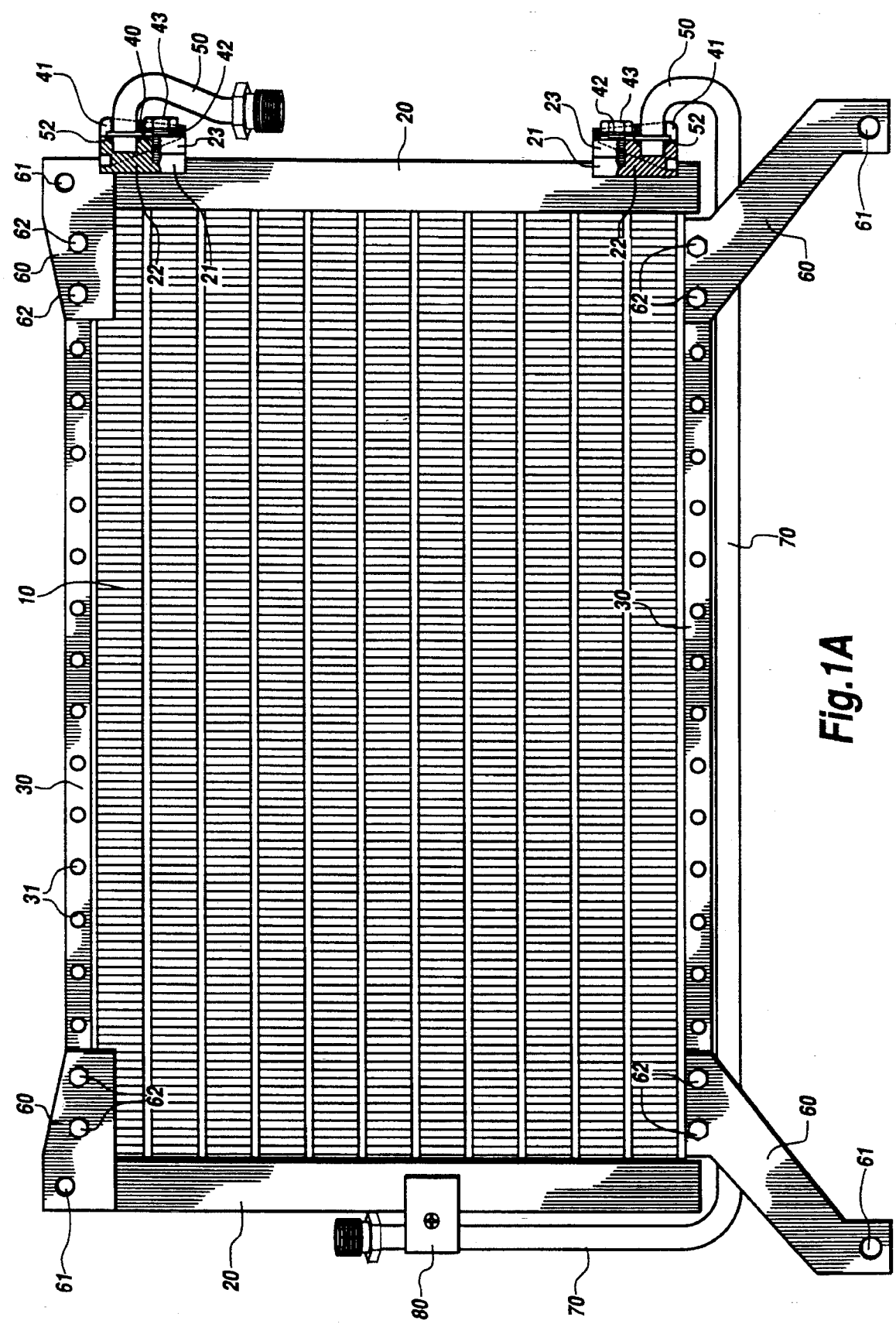
FIG. 1A is an illustration of an air conditioning system condenser of the present invention as a replacement for a first custom built air conditioning system condenser.
Figure 1D:
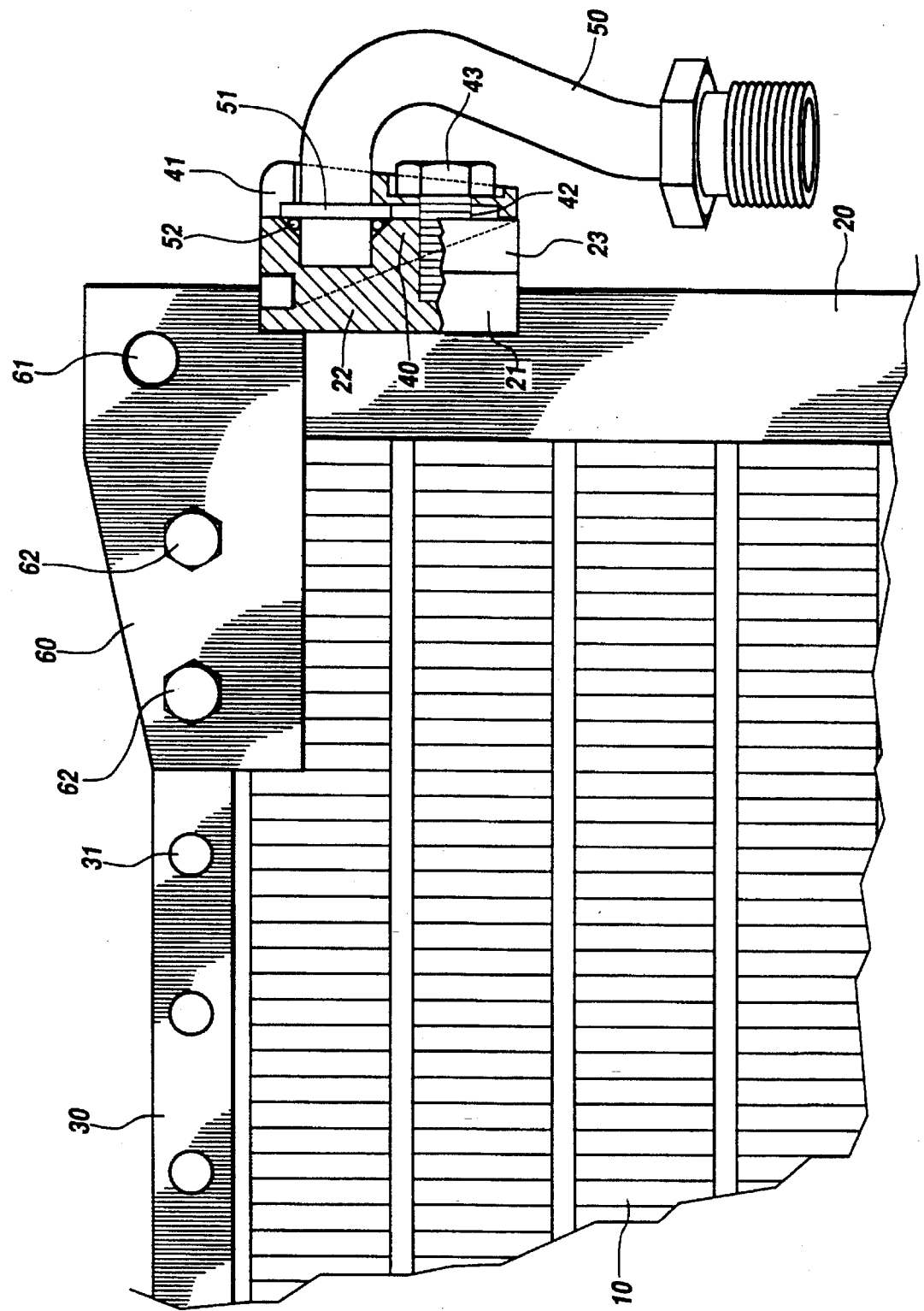
FIG. 1D is an enlargement of the upper-righthand corner of FIG. 1A.
Figure 2A:
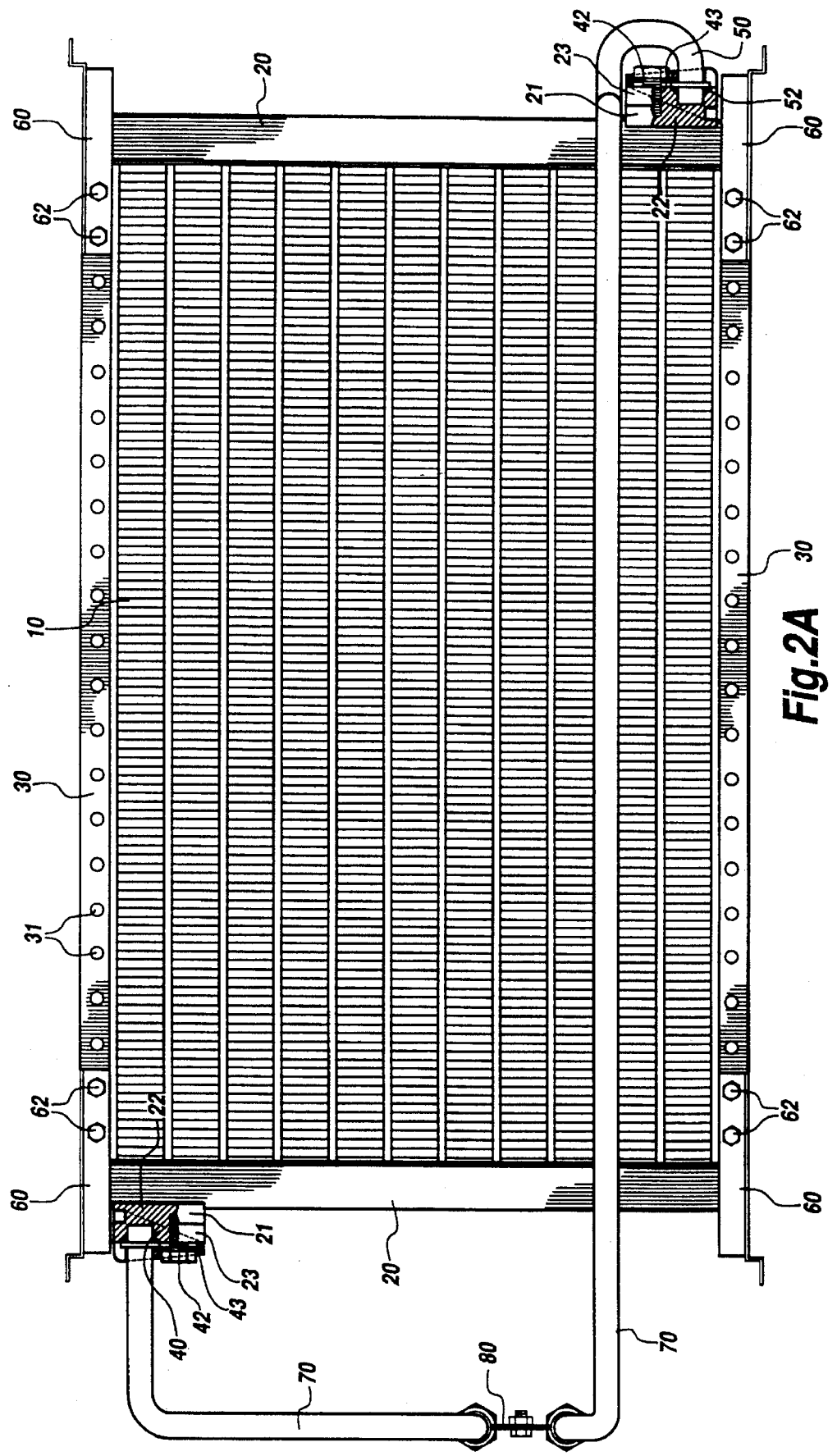
FIG. 2A is an illustration of an air conditioning system condenser of the present invention as a replacement for a second custom built air conditioning system condenser.

Referring now to FIGS. 1A through 3B; there are shown different views of one of the five standard condensers of the present invention assembled with brackets and tubing to duplicate the installation of a custom built automotive air conditioning system. Referring to FIG. 4; there is shown an illustration of a receiver drier of the present invention. FIG. 5 is an illustration of the specifically designed top pad of the receiver drier and FIG. 6 is an illustration of the specifically designed fastener of the receiver drier. The elements of the present invention are numbered consistently in all of the Figures, and any reference to an element in the following description refers to that element in all of the Figures.

Referring to FIGS. 1A through 3B, the condenser comprises a condenser housing 10 integral with vertical tubular members 20 extending along the vertical edges of the condenser housing. The condenser also comprises a set of parallel rail members 30 extending along the top and bottom edges with the first rail member aligned with the front of the housing and the second rail member aligned with the back of the condenser housing.

The vertical tubular members 20 are plugged at both distal ends. A tubular member 20 is integrally fitted with one or more condenser mounts 21 depending on the design of the custom built condenser desired to be duplicated. The condenser mount 21 consists of a rectangular block 22 with vertical ribs 23 integral with the side edges of the rectangular block. The condenser mount 21 serves as a mating assembly for a specifically designed fastener 40 for securing the tube assembly 50 carrying the refrigerant to the condenser. The condenser mount 21 also includes a first opening located below the top edge for receiving the tube assembly 50. The diameter of the opening slowly decreases from the front surface of the rectangular block 22 to the back surface. The edge of the opening is smooth along its length to prevent damage to a circular "O-Ring" seal 52 of the tube assembly 50. The rectangular block 22 also includes a second opening located below the first opening for receiving a bolt 43 which is passed through the specifically designed fastener 40. The bolt 43 serves to secure the specifically designed fastener to the condenser mount 21.

Figure 3A:
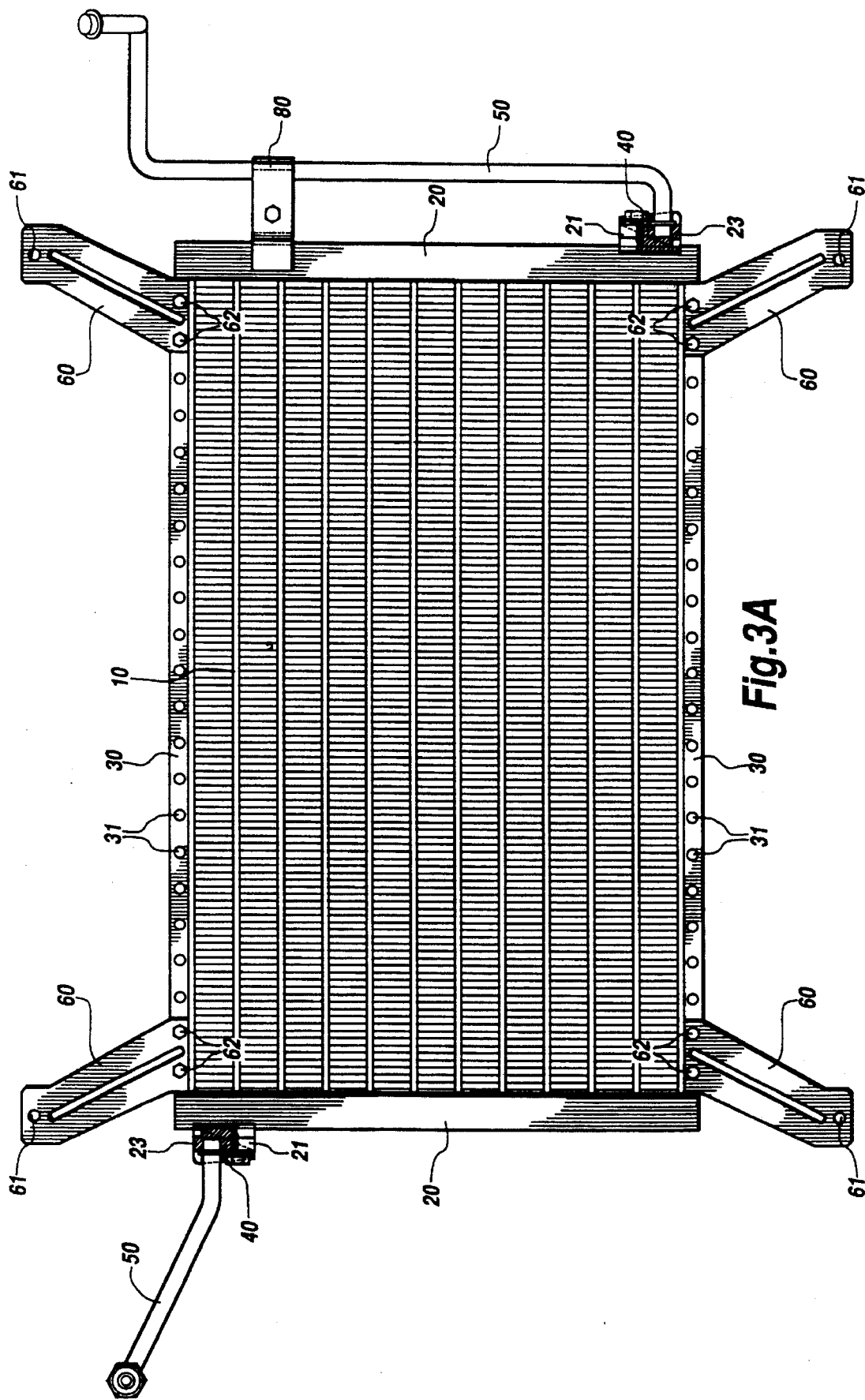
FIG. 3A is an illustration of an air conditioning system condenser of the present invention as a replacement for a third custom built air conditioning system condenser.

The pair of parallel rail members 30 integrally extending from the condenser housing 10 include periodically spaced openings 31 along the length of the rail member. At the end of each rail member 30, two periodically spaced openings 31 are designed to secure a specifically designed bracket 60 to the condenser housing 10. A bolt is passed through each of the last two periodically spaced openings 31 of each of the parallel rail members 30 to fasten the specifically designed bracket 60 to the condenser housing 10. As shown in FIG. 3B, attached to and perpendicularly extending between the parallel rail members 30 are a plurality of tube shaped members 32. The tube member 32 serves to strengthen and brace the parallel rail members 30 to preserve the integrity of the condenser housing 10 when a force is applied by the attached specifically designed bracket 60.

The specifically designed bracket 60 includes a sheet metal bracket in the shape as required by the particular installation. The bracket includes openings 61 on one end for receiving a bolt for securing to the engine well and openings 62 on the other end for receiving a bolt for securing to the rail member 30.

The refrigerant tubes include a tubular member 70 manufactured to various lengths. The tubular member 70 is constructed to be bent upon installation to fit around the obstructions of the engine well. The tubular member 70 also includes a tube assembly 50 located at the distal end of the tubular member. The tube assembly 50 includes a circular rib 51 designed to engage the specifically designed fastener 40 when the tube assembly is inserted into the condenser mount 21. The tube assembly 50 also includes an "O-Ring" seal 52 located between the circular rib 51 and the end of the tubular member 70.

A tubular member 70 is fastened to another tubular member or to the vertical tubular member 20 of the condenser housing 10 using a specially designed tube clamp 80. The tube clamp 80 includes two members fastened together by means of a bolt and shaped at each end to receive either a tubular member 70 or a vertical tubular member 20 of the condenser housing 10.

The specifically designed fastener 40 for securing the tube assembly 50 to the condenser mount 21 includes a vertical member integral with two triangular shaped members extending from said vertical member. The vertical member includes a "U-shaped" indentation 41 which forms a slot for receiving the tube assembly 50 and an opening 42 through which a bolt 43 is passed for securing the fastener to the condenser mount 21. Once the tube assembly 50 is properly inserted into the opening of the condenser mount 21, the specifically designed fastener 40 is assembled over the rectangular block 22 up until the point that the "U-shaped" indentation 41 receives the tube assembly 50. The circular rib 51 of the tube assembly 50 engages the back of the vertical member securing the tube assembly to the condenser mount 21 compressing the "O-Ring" seal 52 to create a liquid and/or gaseous seal. A bolt 43 is inserted through the opening 42 of the vertical member and into the opening of the condenser mount 21 to secure the vertical member to the condenser mount.

Referring to FIG. 4, an air conditioning system of the present invention also includes a receiver drier 90. The receiver drier 90 of the present invention is assembled to a tube connected to the condenser housing 10. The tube assembly 50 of the tubular shaped member 70 is secured to the receiver drier 90 through the use of a specifically designed top pad 100 shown in FIG. 5.

The specifically designed top pad 100 includes a series of openings 102 for receiving a tube assembly 50 and a series of openings 103 for receiving a bolt. The tube assembly 50 is secured to the receiver drier 90 using a specifically designed receiver drier fastener 104 shown in FIG. 6. The specifically designed fastener 104 includes a series of indentations 105 for engaging a tube assembly 50 and a series of openings 106 for receiving a bolt in order to secure the specifically designed fastener to the specifically designed top pad 100.

Although a preferred embodiment of the invention has been illustrated in the accompanying Drawings and described in the foregoing Detailed Description, it will be understood that the invention is not limited to the embodiment disclosed but is capable of numerous modifications without departing from the scope of the invention as claimed.

I claim:

1. A universal condenser for replacement in an air conditioning system, comprising:

a condenser housing having a forward and rear edge along a top and a bottom;

tubular side members, each tubular side member including a condenser mounting block having an opening;

a fastener for engaging the condenser mounting block for coupling a tube assembly to the condenser housing in a sealing engagement, the fastener including a vertical member and two side members extending substantially perpendicularly from the vertical member, each side member having an inwardly projecting lip to form a vertical slot with the vertical member;

a condenser mount attached to the condenser housing adapted to receive the fastener including substantially vertical side ribs positioned to engage the inwardly projecting lips of the fastener of the side members; and parallel rail members attached to and extending across the top and bottom of the condenser housing, a first rail member aligned with the forward edge of both the top and bottom of the condenser housing and a second rail member aligned with the rear edge of both the top and bottom of the condenser housing.

2. The universal condenser of claim 1 further comprising mounting brackets for mounting the condenser housing.

3. The universal condenser of claim 1 wherein the rail members include spaced openings for securing mounting brackets to the condenser housing.

4. The universal condenser of claim 1 wherein the parallel rail members include an integrally extending member for interconnecting the opposed faces of said rail members.

5. The universal condenser of claim 1 wherein the fastener includes an "O-Ring" seal between a tube assembly and the condenser mount.

6. The universal condenser of claim 1 further comprising a receiver drier.

7. The universal condenser of claim 6 further comprising a tube assembly connected to the condenser housing, the receiver drier including a surface member with multiple openings for receiving the tube assembly.

8. The universal condenser of claim 7 further comprising a receiver drier fastener for coupling the tube assembly to the receiver drier in a sealing engagement by securing the receiver drier fastener to the surface member, wherein the receiver drier fastener includes a series of indentations for engaging the tube assembly.

9. A universal condenser for replacement in an air conditioning system, comprising:

a condenser housing including side members, each side member including a condenser mounting block having an opening;

a tube assembly;

a fastener for engaging the condenser mounting block for coupling the tube assembly to the condenser housing in a sealing engagement, the fastener including a vertical member and two side members extending substantially perpendicularly from the vertical member, each side member having an inwardly projecting lip to form a vertical slot with the vertical member;

a condenser mount attached to the condenser housing adapted to receive the fastener including substantially vertical side ribs positioned to engage the inwardly projecting lips of the fastener of the side members;

a receiver drier connected to the condenser housing, the receiver drier including a surface member with multiple openings for receiving the tube assembly; and a receiver drier fastener for coupling the tube assembly to the receiver drier in a sealing engagement by securing the receiver drier fastener to the surface member, wherein the receiver drier fastener includes a series of indentations for engaging the tube assembly.

10. The universal condenser of claim 9 further comprising rail members attached to and extending across the top and bottom of the condenser housing, a first rail member aligned with the forward edge of both the top and bottom of the condenser housing and a second rail member aligned with the rear edge of both the top and bottom of the condenser housing.

11. The universal condenser of claim 10 wherein the rail members include spaced openings for securing mounting brackets to the condenser housing.

12. The universal condenser of claim 9 further comprising mounting brackets for mounting the condenser housing.

13. The universal condenser of claim 11 wherein the parallel rail members include an integrally extending member for interconnecting the opposed faces of said rail members.

14. The universal condenser of claim 9 wherein the fastener includes an "O-Ring" seal between the tube assembly and the condenser mount.

15. A universal condenser for replacement in an air conditioning system, comprising:

a condenser housing;

a condenser mounting block;

a tube assembly;

a fastener for engaging the condenser mounting block for coupling the tube assembly to the condenser housing, the fastener including a vertical member and two side members extending from the vertical member, each side member having a lip to form a slot with the vertical member;

a condenser mount attached to the condenser housing adapted to engage the fastener including side ribs for engaging the inwardly projecting lips of the fastener of the side members;

a receiver drier connected to the condenser housing, the receiver drier including a surface member with multiple openings for receiving the tube assembly; and a receiver drier fastener for coupling the tube assembly to the receiver drier in a sealing engagement by securing the receiver drier fastener to the surface member, wherein the receiver drier fastener includes a series of indentations for engaging the tube assembly.

16. The universal condenser of claim 15 further comprising rail members attached to and extending across the top and bottom of the condenser housing, a first rail member aligned with the forward edge of both the top and bottom of the condenser housing and a second rail member aligned with the rear edge of both the top and bottom of the condenser housing.

17. The universal condenser of claim 16 wherein the rail members include spaced openings for securing mounting brackets to the condenser housing.

18. The universal condenser of claim 15 further comprising mounting brackets for mounting the condenser housing.

19. The universal condenser of claim 16 wherein the parallel rail members include an integrally extending member for interconnecting the opposed faces of said rail members.

20. The universal condenser of claim 15 wherein the fastener includes an "O-Ring" seal between the tube assembly and the condenser mount.

* * * * *